July 2, 1968

E. R. SEWELIN 3,390,914

LOCKING STRUCTURE FOR TILT CAB

Filed May 26, 1966

INVENTOR
ERNEST R. SEWELIN

ATT'Y

July 2, 1968 E. R. SEWELIN 3,390,914
LOCKING STRUCTURE FOR TILT CAB
Filed May 26, 1966 8 Sheets-Sheet 2

INVENTOR
ERNEST R. SEWELIN
ATT'Y

July 2, 1968 E. R. SEWELIN 3,390,914
LOCKING STRUCTURE FOR TILT CAB
Filed May 26, 1966 8 Sheets-Sheet 3
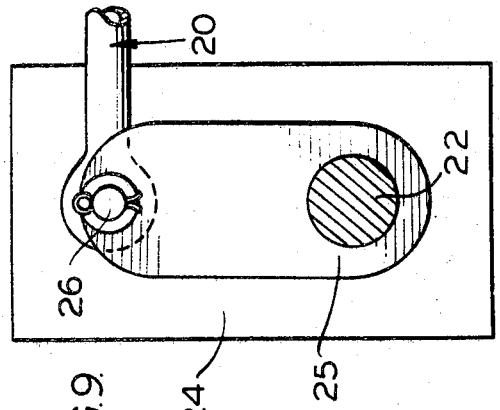
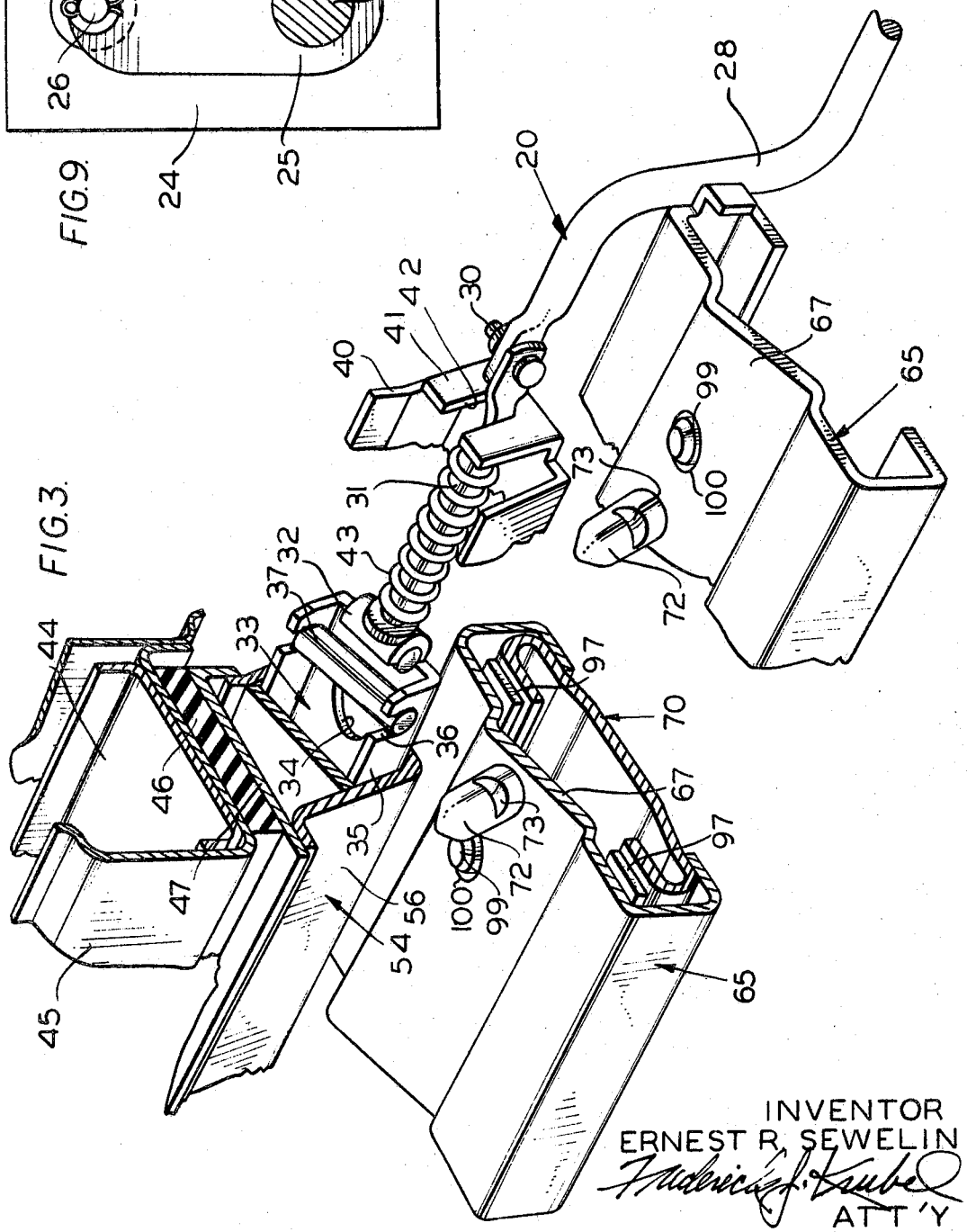
INVENTOR
ERNEST R. SEWELIN
ATT'Y

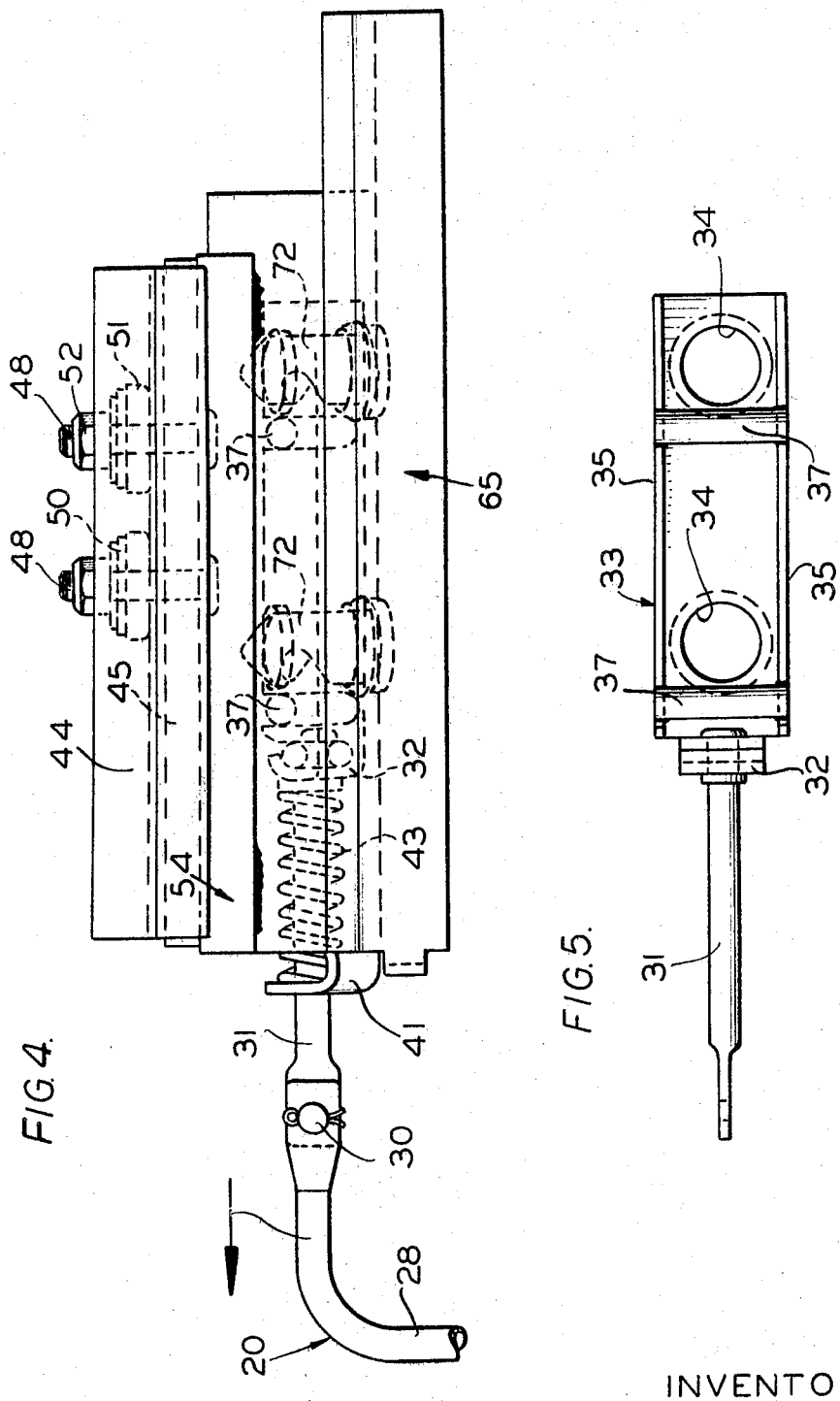

July 2, 1968      E. R. SEWELIN      3,390,914
LOCKING STRUCTURE FOR TILT CAB
Filed May 26, 1966      8 Sheets-Sheet 5
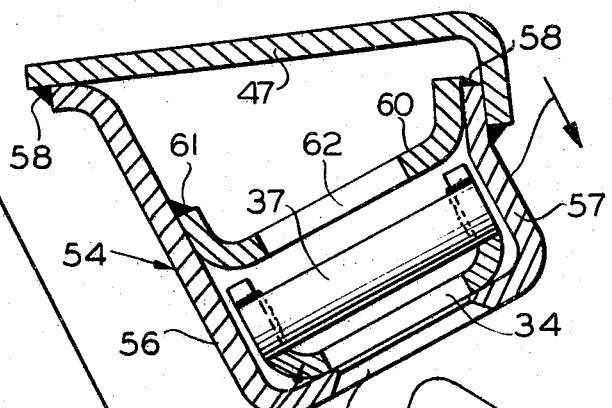
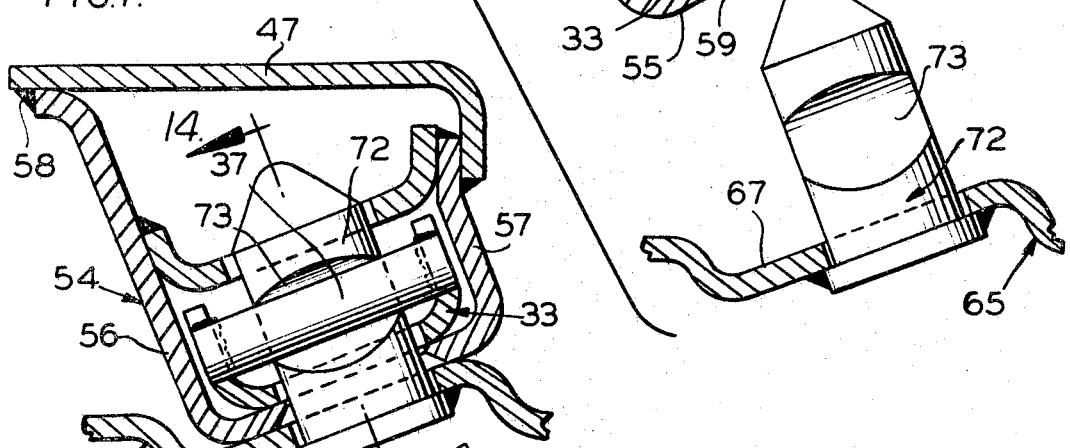
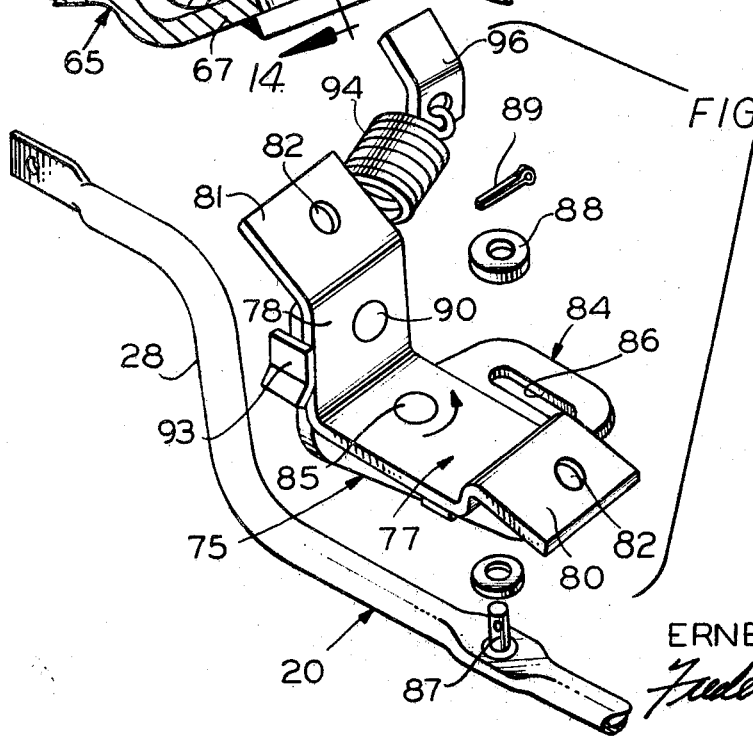
INVENTOR
ERNEST R. SEWELIN
ATT'Y

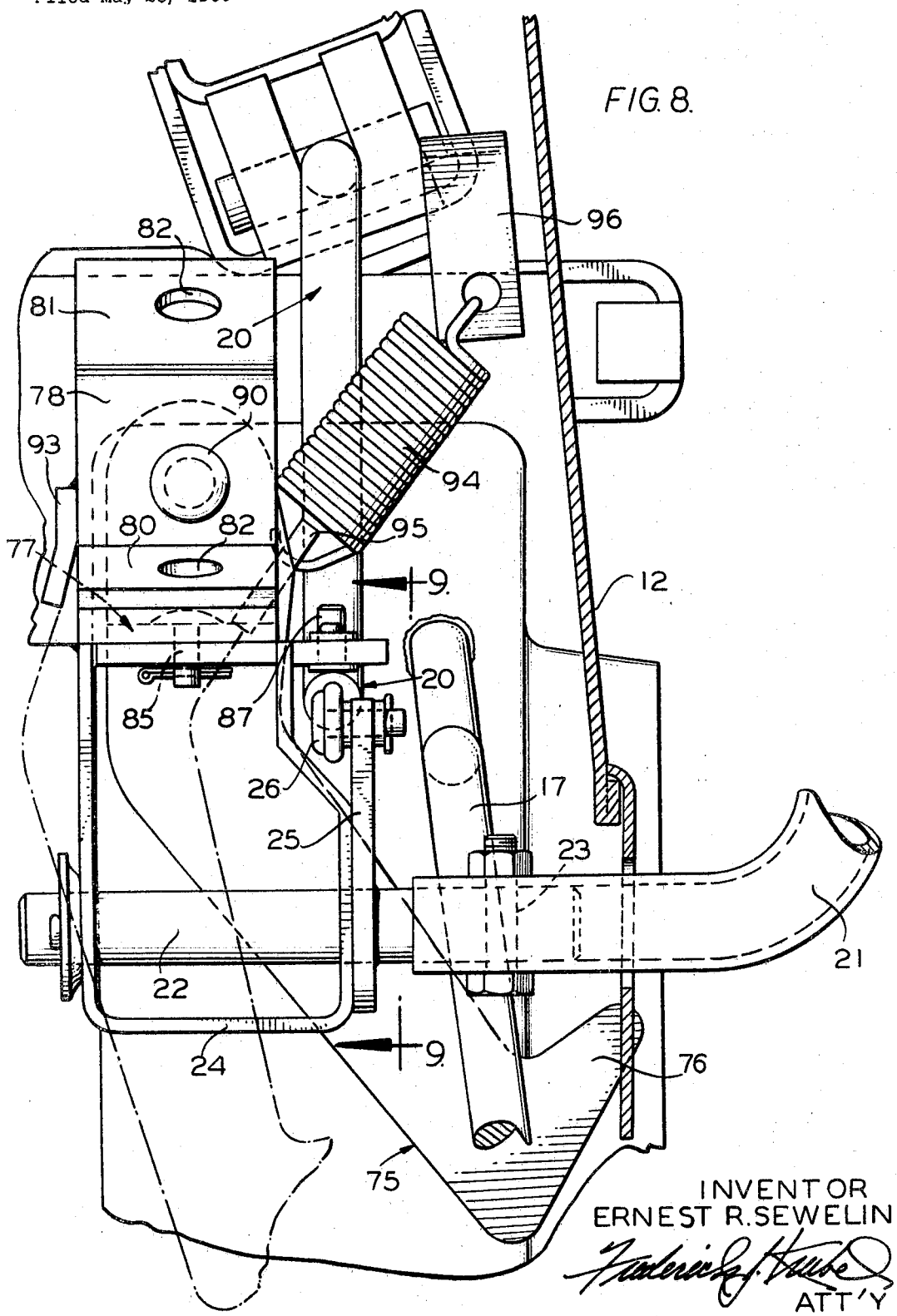

July 2, 1968 E. R. SEWELIN 3,390,914
LOCKING STRUCTURE FOR TILT CAB
Filed May 26, 1966 8 Sheets-Sheet 7

INVENTOR
ERNEST R. SEWELIN
ATT'Y

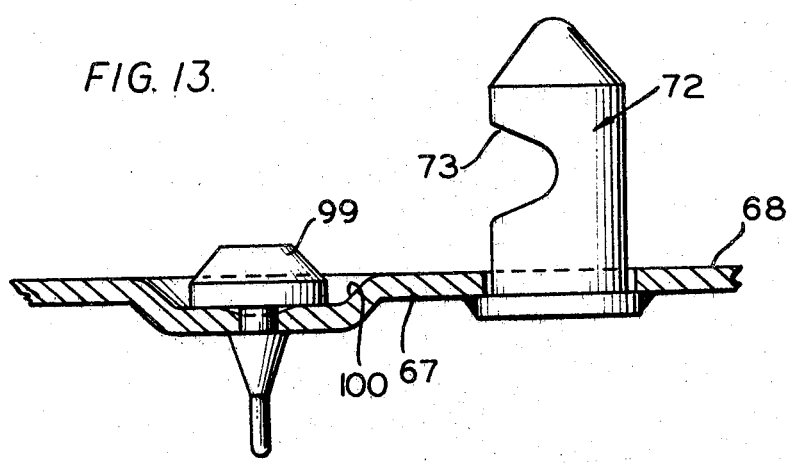
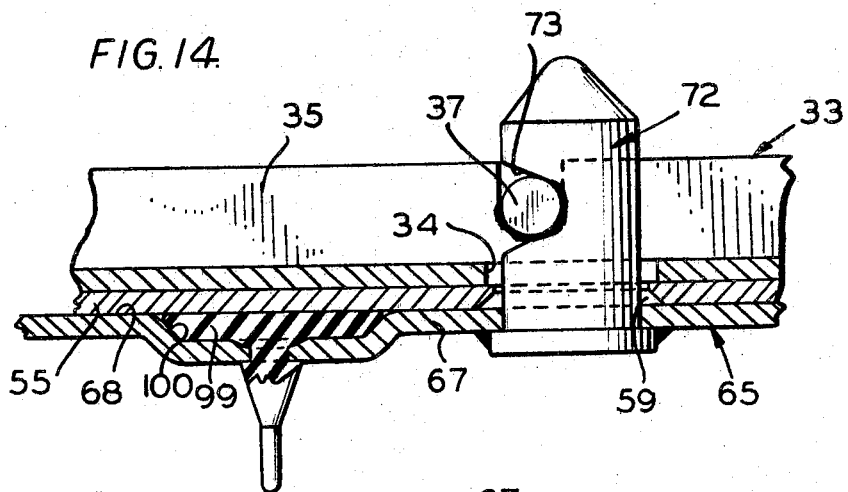
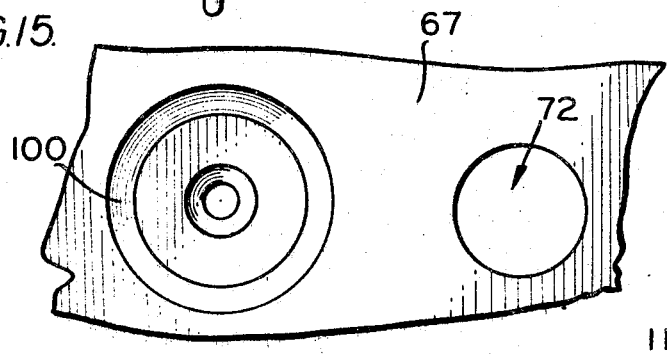

United States Patent Office 3,390,914
Patented July 2, 1968

3,390,914
LOCKING STRUCTURE FOR TILT CAB
Ernest R. Sewelin, Waterloo, Ind., assignor to International Harvester Company, Chicago, Ill., a corporation of Delaware
Filed May 26, 1966, Ser. No. 553,105
10 Claims. (Cl. 296—35)

ABSTRACT OF THE DISCLOSURE

A locking mechanism for a truck cab of the C.O.E. type pivotally connected to the chassis frame and capable of tilting forwardly to a fully raised position from a normally lowered position. The locking mechanism includes a releasable lock structure for securely and positively locking the cab in its normally lowered position and a safety latch means for limiting swinging of the cab from its normally lowered position to a predetermined, partially raised position, and a single actuating member constrained to rock in a single plane sequential manner in opposite directions from a neutral position to first effect release of the lock structure and then release of the safety latch means.

---

The invention relates to tilting cab vehicles and the like, and has reference in particular to improved locking structure for the tilting cab of such vehicles having a latching lever combined therewith.

In the cab-over-engine or tilting cab type of truck, the cab is pivotally secured to the vehicle frame at the front end of the frame, so that when the cab is tilted forwardly the engine is exposed for convenient servicing and for repairs. The invention is concerned with locking structure for locking the cab to the vehicle frame when the cab is in closed position over the engine, and which said locking structure can be conveniently released by the operator. Accordingly, one of the basic objectives of the invention is to provide improved locking structure which will securely and positively lock the cab in closed position to prevent any inadvertent release thereof, and wherein these objectives are achieved by relatively simple means, embodying the minimum number of parts and which can be economically manufactured and installed.

Another object of the invention is to provide locking structure for the purposes described which will embody one or more upstanding pins having notches for receiving spring energized locking rollers or rods. Since the rollers or rods are spring energized in a locking direction the structure will automatically lock when the cab is closed, although it is necessary to positively withdraw the rollers or rods against the tension of the spring means in order to release the cab for pivotal movement into an open position.

Another objective of the invention resides in the provision of locking mechanism for a tiltable cab which will have a safety latch combined therewith, and wherein it is necessary to actuate the locking mechanism and safety latch in sequence in order to completely free the cab for full tilting movement.

A further object is to provide locking mechanism of the character described having a safety latch in combination therewith, the said locking mechanism and safety latch being so constructed and arranged that movement of a pivotal handle in one direction actuates the locking mechanism for release, and movement of the handle in an opposite direction actuates the safety latch into a release position.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts:

FIGURE 3 is a perspective view of the locking structure of the invention showing the movable parts carried by the cab in spaced separated relation from the parts carried by the vehicle frame and providing the notched pins;

FIGURE 4 is a side elevational view showing the movable and stationary parts of the locking structure in contacting engagement but with the spring energized rods in withdrawn position to enable release of the tiltable cab;

FIGURE 5 is a plan view of the locking structure as shown in FIGURE 4;

FIGURE 6 is a fragmentary sectional view taken transversely through the movable and stationary parts of the locking structure and showing the parts in spaced separated relation;

FIGURE 7 is a fragmentary sectional view similar to FIGURE 6 but showing the movable and stationary parts of the locking structure in locked relation;

FIGURE 8 is a vertical sectional view taken substantially on line 8—8 of FIGURE 1 and looking in the direction of the arrows;

FIGURE 9 is a sectional view taken substantially on line 9—9 of FIGURE 8 and showing the manually actuated arm and its pivotal connection to the actuating rod;

FIGURE 10 is an exploded perspective view showing certain structure for effecting actuation of the latching lever into a release position;

FIGURE 13 is a fragmentary, vertical sectional view of one of the locking pins and rubber bumpers;

FIGURE 14 is a vertical sectional view taken substantially along line 14—14 of FIGURE 7, and FIGURE 15, is a plan view of the structure shown in FIGURE 13 with the bumper removed.

Figure 1:
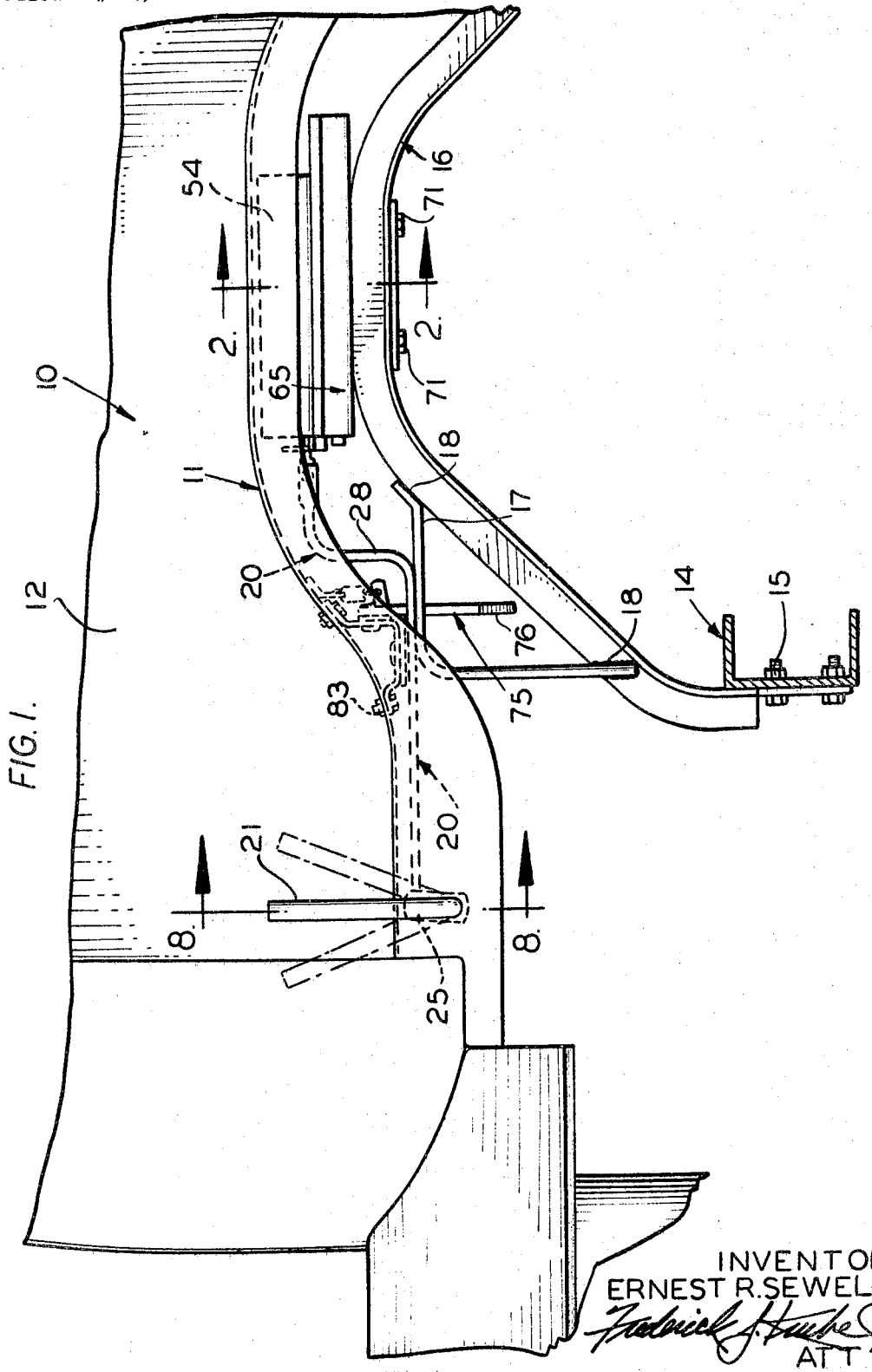
FIGURE 1 is an elevational view showing the rear of a tiltable cab and certain frame elements of the vehicle with the locking mechanism and safety latch of the invention in associated relation, the tiltable cab and locking structure being shown in a closed locked position.

In FIGURE 1 the rear end of a tiltable cab 10 is shown, the same including a transverse frame member 11 and metal siding 12. The chassis of the vehicle includes the longitudinal channel element 14, one being located on each side of the vehicle and to which is suitably secured, by the bolts 15, an arcuately bent transverse frame member 16. The latching bar 17 is fixed to the frame member 16 by being welded thereto at 18.

FIGURES 2 to 7, inclusive, illustrate details of the locking structure for the tiltable cab. The locking structure is actuated by a rod 20 which may be termed an actuating rod or push-pull rod and which is in turn manually reciprocated by an oscillatable lever 21 conveniently located exteriorly of the cab. The lever 21 is fixed to a stud shaft 22, FIGURE 8, by being telescoped on said shaft and the parts are secured by the bolt 23. The stud shaft 22 is journalled in the U-shape bracket 24 which is suitably fixed so as to depend from the frame member 11 of the cab, it being understood that the oscillatable lever, the actuating rod, the latching lever and the movable part of the locking structure are all carried by the cab and thus they have bodily movement with the cab in its tilting action. The pivotal connection between the manual level 21 and the actuating rod 20 is shown in FIGURE 9 wherein it will be seen that an upstanding arm 25 fixed to the stud shaft 22 carries at its upper end the pin 26. The said pin pivotally joins the flattened end 27 of the actuating rod 20 to the arm 25 and thus to the oscillatable lever 21.

The actuating arm 20 extends transversely of the cab to connect with the locking mechanism, the said rod having a right angle bend 28 intermediate its length. To the right of said intermediate bent portion as shown in FIGURE 1 the rod terminates and said terminating end as shown in FIGURE 3 is pivotally connected by the bolt 30 to the carriage rod 31. The said carriage rod at its opposite end is fixed to the curved portion 32 formed integral with the slidable carriage indicated in its entirety by numeral 33. One or more openings such as 34 are formed in the base wall of the carriage 33 and the two side walls 35 of the carriage are slotted at 36 for receiving the locking rods 37. The rods have their ends disposed in the slots and are rigidly secured to the carriage by means of welding or the like. Thus, the rods extend transversely from side wall to side wall of the carriage. In the present embodiment of the carriage two openings such as 34 are formed in the base wall of the carriage 33 and thus two rods such as 37 are carried by the carriage, each rod being located relatively adjacent an opening 34 and to the side of the opening towards the carriage rod 31.

At the pivotally connected end of the rod 31 the cab of the vehicle provides frame structure as shown in FIGURE 3 including a U-shaped element 40 which provides a front wall 41, the same being slotted at 42 for receiving the carriage rod 31. For purposes to be presently described a coil spring 43 encircles the carriage rod 31 and the coil spring is confined between the part 32 integral with the carrier 33 and the front wall 41 of the frame element 40. It will be observed that the action of the coil spring 43, since it is backed by the fixed front wall 41, is to resiliently urge the carrier 33 in a direction toward the left, FIGURE 3.

Figure 2:
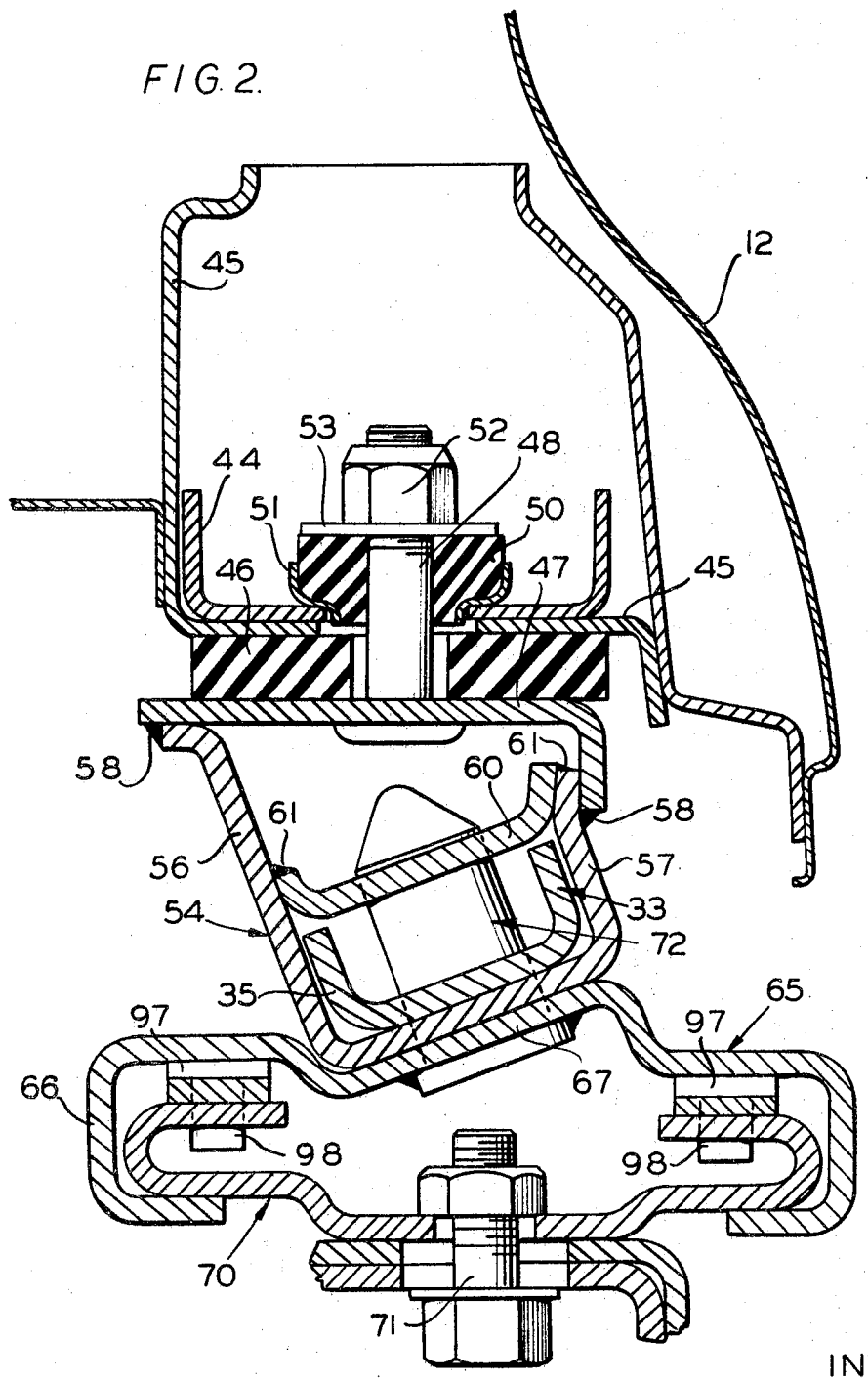
FIGURE 2 is a transverse sectional view taken through the locking mechanism shown in FIGURE 1 substantially on line 2—2 and looking in the direction of the arrows.
Figure 11:
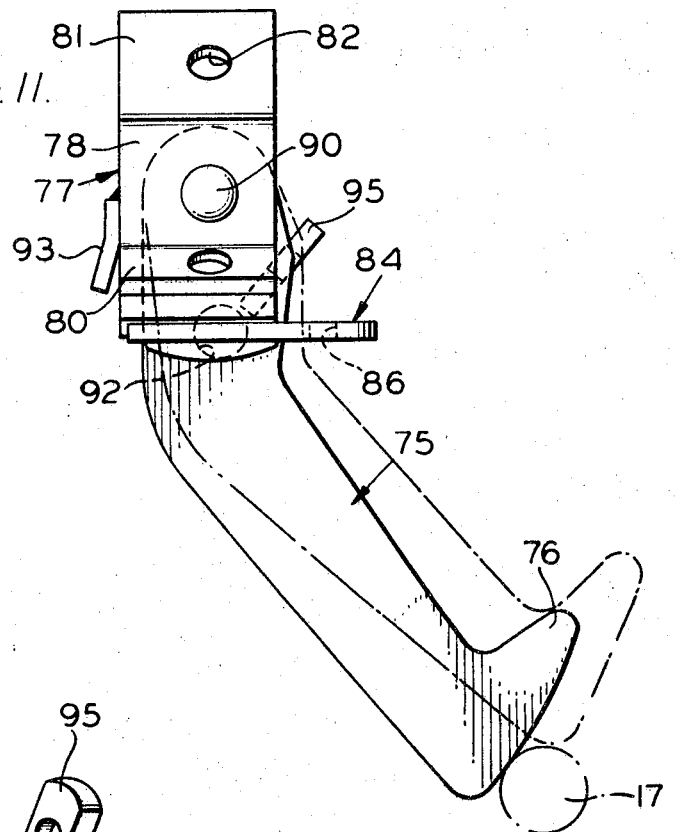
FIGURE 11 is an end elevational view showing the latching lever and the actuating plate for pivoting the same.

The tiltable cab of the vehicle provides additional frame elements which mount the carrier 33 for reciprocating movement. Accordingly the frame elements 44 and 45 retain a pad of resilient material 46 which depends from the undersurface of the frame element 45. The pad of resilient material 46 is interposed between frame element 45 and the frame element 47 in order to take up shock and vibration to which the element 47 is subjected in the closing of the tiltable cab and during normal operation of the vehicle. Additionally, the resilient pad 46 accommodates relative lateral angular movement between the frame elements 45 and 47 which movement is induced by the frame cross member 16 when the chassis frame is in twist. Thus, possible damage to the latching assembly is mitigated. As best shown in FIGURE 2 the frame element 47 is apertured for receiving the securing bolts 48 which extend upwardly through the pad 46 of resilient material to the frame elements 45 and 44. Additional shock absorbing resilient material in the form of a washer 50 is located on each of the securing bolts 48, the body portion of the washer 50 being retained by the cup-shaped container 51. Each of the bolts 48 accommodates the threaded nut 52 and also the metal washer 53 which is interposed between the threaded nut and the part 50 of resilient material.

Referring again to the frame element 47 it will be observed that the same provides a support to which is secured the channel member indicated in its entirety by numeral 54. The channel member is disposed at an angle so that its bottom wall 55 will best accommodate the part of the locking structure carried by the chassis frame when the cab is in locked relation. Thus the side wall 56 of the channel member is longer than side wall 57. However, each wall is suitably welded at 58 to frame element 47 and the channel member is additionally provided with an inside top wall 60. The top wall 60 is suitably welded at 61 to the channel member and the same is provided with spaced openings 62 which are formed in the top wall in substantial alignment with the openings 59 in the bottom wall 55 and with openings 34, respectively, as shown in FIGURE 6. The channel formed by the channel member 54, together with the top wall 60, is occupied by the slidable carrier 33, it being observed that the space provided by the channel member is sufficient to accommodate the carrier with provision for free reciprocating movement of the carrier. The carrier 33, the channel member 54, and the frame elements including the resilient pad 46 and associated securing elements, are all carried by the cab, and accordingly this structure comprises the movable part of the locking structure. The transverse frame member 16 carries part of the locking structure which part provides the locking pins which will now be described.

As best shown in FIGURES 2 and 3 the main frame element of those parts of the locking structure stationary with respect to the cab or carried by the chassis frame is indicated in its entirety by numeral 65, the same having U-shaped side extremities 66 and an angled intermediate wall section 67. The wall section 67 is angled so that its top surface 68 is complementary to the bottom surface 55 of the channel member 54. This angling of the two members is a desirable feature and it is almost a prerequisite that they have the same slope since the bottom wall of the channel member is adapted to contact and rest on the intermediate wall of the main frame element 65. The said main frame element is mounted on the supporting frame 70 for relative limited transverse sliding movement which is fixed to the transverse frame member 16 by securing bolts such as 71. Without this freedom of movement, under chassis twist conditions, pins 72 would fail to register with openings 34 and the rods 37 to that latching of the cab would become virtually impossible. In addition, it is noteworthy to mention that were it not for the provisions of this freedom of lateral movement between members 65 and 70, excessive forces generated by the oscillating movement of cross member 16 would possibly destroy the entire locking or latching mechanism. Accordingly the supporting frame 70 and the main frame element 65 carried thereby comprise the stationary or that part of the locking structure carried by the chassis frame. In accordance with the invention this stationary part of the structure carries the locking pins 72, the pins each extending through an aperature in the intermediate wall 67 of the main frame element 65 and being welded to the underside of the intermediate wall section. In order for the pins to have locking engagement with the rods 37 it will be observed that the pins are notched at 73.

It is believed that the locking action of the present device is clearly apparent from the above description of the elements. With the cab in closed position, the bottom wall 55 of the channel member 54 will seat on the wall 67 of the main frame element 65, FIGURES 6 and 7. Since the pins 72 are aligned with the openings 59, the pins enter the said openings respectively, and extend into the openings 34 and 62 of the carrier 33. However, the carrier is spring urged in a direction to cause the rods 37 to enter the notches 73 in the pin, and when the rods have snapped into place the cab will be securely locked in closed position with the movable part of the locking structure in contact with and resting on the stationary part of said structure.

To release the cab the operator oscillates the manual lever 21, turning the same to the left, FIGURE 1, which pulls on the actuating rod 20 and on the carriage rod 31. Said carriage rod and the carrier 33 are thus withdrawn against the compressive force of the coil spring 43 and this reciprocating movement of the carrier to the right, FIGURE 3, will withdraw the rods 37 from the pin notches 73 and the locking structure is accordingly released.

In addition to actuating the locking mechanism, the rod 20 also actuates a latching lever 75 having a hook end 76 adapted to engage the latching bar 17. The latching lever will engage the bar 17 following release of the cab, and thus the cab will have only limited movement in an opening direction until the latching lever 75 is actuated into a full release position. This is accomplished by oscillating the lever 21 in a direction towards the right, FIGURE 1. Reciprocation of the actuating rod 20 in a right hand direction for releasing the latching lever does not adversely interfere with the locking structure, since at this point in the operation of the parts the cab is partially open and the movable part of the locking structure is in spaced relation with respect to the stationary part.

Referring to FIGURES 1, 8 and 10, the bracket 77 is formed with a rear vertically disposed portion 78 and with terminal flange portions 80 and 81. Each of the terminal flange portions are angled with respect to the bottom wall of the bracket 77 and each portion is apertured as at 82 for receiving a securing bolt 83 which securely fastens the bracket 77 to the transverse frame member 11 so that the bracket depends therefrom, with the bottom wall being disposed substantially horizontally when the cab is closed and locked. An actuating plate 84 is pivotally secured to the underside of the bottom wall of the bracket 77 by means of the pivot pins 85, and as will be observed from FIGURE 10 the projecting right hand edge of the plate is slotted at 86. The plate is operatively connected to the actuating rod 20 by means of the pin 87 fixed to the rod and projecting upwardly therefrom so as to extend through the slot 86. Washers such as 88 are located on the pin above and below the plate 84 and the parts are held in connected relation by the cotter pin 89.

Figure 12:
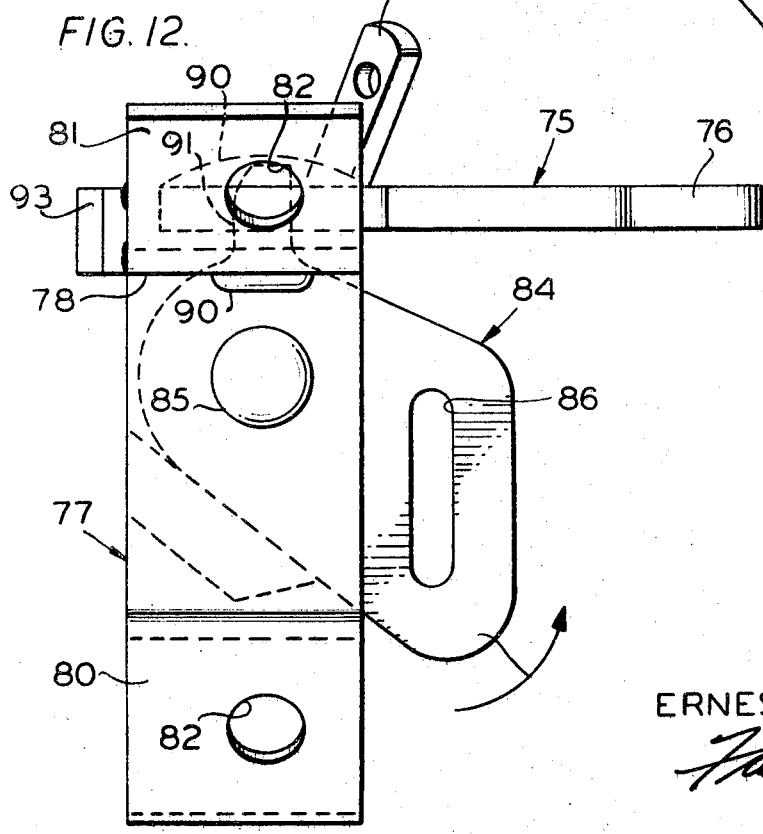
FIGURE 12 is a top plan view of the structure shown in FIGURE 11 and which better illustrates the operative connection between the actuating plate and the latching lever.

The function of the pivotal plate 84 is to impart pivotal movement to the latching lever 75. It will be observed from FIGURES 10 and 12 that the latching lever is pivotally secured by the pivot pin 90 to the vertical portion 78 of the bracket 77. The plate 84 is provided with an extension 91 which extends rearwardly of the plate and which enters the opening 92 provided in the latching lever. Thus pivotal movement of the plate is imparted to the latching lever. Movement of the lever in a direction towards the left is limited by means of the stop element 93 and said lever is resiliently biased so as to swing in a direction towards the right by means of the coil spring 94. One end of the coil spring is fixed to the lug 95 forming part of or being suitably fixed to the latching lever and the opposite end of the coil spring 94 is anchored to the fixed bracket 96.

It has been previously described that the actuating lever 21 when oscillated to the left, FIGURE 1, will reciprocate the carrier 33 in a direction towards the left so as to withdraw the rods 37 from the notches in the pin 72 and effect release of the locking structure. This allows the operator to open the cab to a limited extent since the latching lever 75 will eventually engage the latching bar 17. Further movement of the cab in an opening direction is thus prevented by the latching lever and it is necessary to actuate the lever into a release position before full opening movement of the cab is possible. Actuation of the latching lever into a release position is conveniently accomplished by the operator by oscillating the lever 21 in a direction to the right, FIGURE 1. When the lever 21 is in a neutral position the pin 87 will be located in the rear end of the slot 86 such as illustrated in FIGURE 10. Thus oscillating movement of the lever 21 to the right will rotate the plate 84 in a counterclockwise direction, FIGURE 10, and due to the operative connection of the projection 91 with the latching lever, the said lever is caused to pivot in a clockwise direction. As a result of this movement of the latching lever, the hook end 76 of the lever is moved out from under the latching bar 17 and the operator is thus able to complete the opening movement of the cab.

It will be observed from the foregoing that the oscillating lever 21 must be first actuated in a direction towards the left, FIGURE 1, to release the locking structure and only then is it possible to oscillate the latching lever in a direction towards the right for effecting release of the latching lever. This sequence in the movement of the oscillating lever is predetermined due to the fact that the lever and thus the actuating rod 20 cannot be moved in a right hand direction until release of the locking structure. When the spring energized rods 37 are located in the notches 73 of the locking pins it is not possible to oscillate the lever 21 in a right hand direction. Accordingly it is not possible for the operator to prematurely release the latching lever 75 since this can be accomplished only following release of the locking structure.

As evidenced in FIGURE 2, a pair of leaf springs 97 are interposed between the relative slidable parts 65 and 70. The leaf springs 97 react against the parts 65 and 70 and are capable of providing a frictional restraining force or drag between the parts which is sufficient to assure that the pins 72, which are rigidly attached to and carried by the sliding member 65, are not accidentally bumped or pushed out of registration with the openings 35 while the cab is in its unlatched position. The end tabs 98 of the springs 97 are arranged to hook over and fit into suitable notches in the member 70 and are thus prevented from being disengaged from the assembly while being free to deflect vertically and bring pressure to bear against the inner surface of member 65 and the upper lip surface of member 70.

It has been found desirable to interpose two rubber bumpers 99 (only one of which is shown in FIGURE 13), between the lowermost surface of wall 55 and the top surface 68 of wall section 67. The rubber bumpers 99 serve to eliminate rattling of the engaging surfaces, one against the other, in the event production tolerances result in loose fitting of the related part; i.e. pin notches 73, pin slide assembly and the rod carriage assembly. The rubber bumpers 99 also function to keep the carriage rods 37 in firm contact with the surfaces defining the upper parts of the notches 73 by means of the pressure of the compressed bumpers 99 against the wall 55 which pressure is effective to vertically urge slide 33 and, consequently, rods 37 firmly against the aforementioned upper notch surfaces of the pins 72.

Each bumper 99 and the circular cavity 100 in wall section 67 into which it fits are so designed that when the bumper 99 is compressed flush with the uppermost surface of the member 65, as shown in FIGURE 14, the cavity 100 becomes completely filled with bulged rubber which now becomes incompressible by virtue of being completely confined. The angle of the upper notch surfaces of the pins 72 was chosen, so that the combined resultant force exerted by the compressed bumpers 99 and the spring 43 caused the rods 37 to be firmly pressed into engagement with such upper notch surfaces of the pins 72. Consequently, inadvertent disengagement of the rods 37 and pins 72 is virtually impossible.

The invention is not to be limited to or by details of construction of the particular embodiment thereof illustrated by the drawings, as various other forms of the device will, of course, be apparent to those skilled in the art without departing from the spirit of the invention or in the scope of the claims.

What is claimed is:

1. In a motor vehicle of the type having an operator's compartment mounted on a chassis frame, said operator's compartment being swingable between a normally lowered position and a fully raised, forwardly tilted position and including a generally transversely extending, substantially rigid cab frame means disposed at the rearwardmost end thereof, a pin fixed to said chassis frame, said pin extending through an opening formed in a wall portion of said cab frame means when said operator's compartment is in its normally lowered position; said locking structure further including a member supported by said cab frame means for relative sliding movement, said member being movable between a lock position wherein said member and pin are in locking engagement with each other when said operator's compartment is in its normally lowered position and a release position wherein said member and pin are out of locking engagement with each other; manually operable means carried by said operator's compartment and operatively connected to said locking structure, said manually operable means being movable in one direction from a neutral position to a first position for actuating said locking structure to a release condition from a lock condition, said manually operable means including an operating lever supported by said cab frame means for oscillating movement exteriorly of said operator's compartment, said member being operatively connected to said operating lever and said lock and release positions of said member corresponding to said neutral and first positions, respectively, of said operating lever; biasing means for yieldably urging said member toward said lock position; releasable safety latch means, said safety latch means being operable to limit swinging movement of said operator's compartment to a predetermined, partially raised position and to prevent swinging movement of said operator's compartment to its fully raised, forwardly tilted position; and release means operatively connected to said safety latch means for releasing said safety latch means, said release means being actuable by said manually operable means to release said safety latch means, said manually operable means being movable in a second direction from said neutral position to a second position for actuating said release means to release said safety latch means, said operating lever being oscillatory in a single plane between first, second and neutral positions corresponding to said first, second and neutral positions, respectively, of said manually operable means.

2. The combination as set forth in claim 1, wherein said safety latch means includes a generally transversely extending, elongated latch bar fixed to said chassis frame and a latching lever pivotally supporting on said cab frame means for rocking movement about a generally transversely extending axis, said latch lever having one end provided with a projecting hook portion, said latch lever being movable between a latching position wherein said latch bar lies in the path of movement of said hook portion as said operator's compartment is swung between its normally lowered and fully raised, forwardly tilted positions and an unlatching position wherein said latch bar is without the path of movement of said operator's compartment as said operator's compartment is swung between its normally lowered and fully raised, forwardly tilted positions; and spring means for yieldably urging said latch lever to its latching position.

3. The combination as set forth in claim 2, wherein said manually operable means further includes a generally transversely extending link means having one end connected to said member and its opposite end operatively connected to said operating lever; and means operatively connecting said operating lever and said release means, said means being effective to cause said release means to be actuated to rock said latching lever to its unlatching position as said operating lever is moved from its neutral position to its second position, said means permitting movement of said operating lever from its neutral position to its first position without actuating said release means.

4. The combination as set forth in claim 3, wherein said release means includes a plate supported on said cab frame means for oscillatory movement about an axis substantially perpendicular to the pivotal axis of said safety latching lever, said plate being operatively connected to said latching lever whereby oscillation of said plate effects rocking of said latching lever, said plate being provided with an elongated slot therethrough for receiving a pin carried by said link means, said pin projecting through said plate and being disposed at one end of said slot when said operating lever is in its neutral position and at the opposite end of said slot when said operating lever is in its first position.

5. The combination set forth in claim 4, wherein said pin of said locking structure is provided with a notch, said member having a wall thereof provided with an opening therethrough, said opening being in registration with said opening formed in said wall portion of said cab frame means and said pin extending through said registering openings when said operator's compartment is in its normally lowered position, said locking structure further including a rod supported on said member, said rod being disposed in said notch when said member is in its lock position and said operator's compartment is in its normally lowered position, the longitudinal axis of said rod being substantially normal to the longitudinal axis of said pin when said pin is disposed in said notch.

6. The combination as set forth in claim 5, including means for automatically causing said safety latch lever to move from its latching position to its unlatching position during a portion of the movement of said operator's compartment from its raised forwardly tilted position to its normally lowered position against the resilient action of said spring means, said spring means being effective to automatically return said latch lever to its latching position when said operator's compartment reaches said predetermined, partially raised position during such swinging movement of said operator's compartment, said means including a cam surface formed on said hook portion of said latch lever, said cam surface being engageable with said latch for driving said portion of such movement of said operator's compartment to effect pivotal movement of said latch lever.

7. The combination as set forth in claim 6, wherein the head of said pin is substantially cone-shaped, the surface of said cone-shaped head serving as cam means for engaging said roller and automatically sliding said member to its release condition from its lock condition against the resilient action of said biasing means during swinging movement of said operator's compartment from its raised, forwardly tilted position to its normally lowered position, said biasing means being effective to automatically cause said member to move to its lock condition and said roller to enter said notch when said notch and rod are brought in alignment with each other when said operator's compartment reaches its normally lowered position during such swing movement of said operator's compartment.

8. In a motor vehicle of the type having an operator's compartment mounted on a chassis frame, said operator's compartment being swingable between a normally lowered position and a fully raised, forwardly tilted position, the combination including said operator's compartment and chassis frame, comprising locking means operable for releasably securing said operator's compartment to said chassis frame in its normally lowered position; safety latch means operable for limiting swinging movement of said operator's compartment in one direction from its normally lowered position to a predetermined, partially raised position, said safety latch means being operable to permit swinging movement of said operator's compartment from said predetermined partially raised position to said fully raised, forwardly tilted position; and manually operable means carried by said operator's compartment and operatively connected to said locking means and said safety latch means, said manually operable means including a single actuating member movable in one direction from a neutral position to a first position to effect releasing of said lock means, said single actuating member being movable in a second direction from said neutral position to a second position to render said safety latch means ineffective to limit swinging movement of said operator's compartment in said one direction from its normally lowered position to said predetermined, partially raised position, means operable for containing said actuating member from moving from said neutral position to said second position when said locking means is in its unreleased condition and said operator's compartment is in its normally lowered position.

9. The combination as set forth in claim 8, wherein said operator's compartment includes a generally transversely extending, substantially rigid cab frame element disposed at the rearward end of said operator's compartment; and wherein said single actuating member is in the form of an operating lever supported by said cab frame element for rocking movement in a single vertical plane between said first, second and neutral position, said operating lever being disposed exteriorly of said operator's compartment.

10. The combination as set forth in claim 9, wherein said safety latch means includes a generally transversely extending, elongated latch bar fixed to said chassis frame and a latching lever pivotally supported on said cab frame element, said latch lever having one end provided with a projecting hook portion; said latch lever being movable between a latching position corresponding to said neutral position of said actuating member wherein said latch bar lies in the path of movement of said hook portion as said operator's compartment is swung between its normally lowered and fully raised, forwardly tilted positions and an unlatching position corresponding to said second position of said actuating member wherein said latch bar is without the path of movement of said hook portion as said operator's compartment is swung between its normally lowered and fully raised, forwardly tilted positions; and spring means for yieldably urging said latch lever to its latching position.

References Cited

UNITED STATES PATENTS

| | | | |
|---|---|---|---|
| 2,864,121 | 12/1958 | Imber et al. | 180—89 X |
| 2,943,693 | 7/1960 | Norrie | 180—89 |
| 2,947,376 | 8/1960 | Norrie | 180—89 |
| 2,951,548 | 9/1960 | Crockett et al. | 180—89 |
| 3,184,262 | 5/1965 | Mintz | 296—35 |

BENJAMIN HERSH, *Primary Examiner.*

J. A. PEKAR, *Assistant Examiner.*